US009257913B1

(12) United States Patent
McDonald (10) Patent No.: US 9,257,913 B1
(45) Date of Patent: Feb. 9, 2016

(54) LLC CONVERTER AND LOSS OF INDUCTIVE MODE DETECTION CIRCUIT

(71) Applicant: Texas Instruments Incorporated, Dallas, TX (US)

(72) Inventor: Brent Alan McDonald, Murphy, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 14/479,279

(22) Filed: Sep. 6, 2014

(51) Int. Cl.
*H02M 3/335* (2006.01)
*H02M 3/337* (2006.01)

(52) U.S. Cl.
CPC ................................ *H02M 3/33569* (2013.01)

(58) Field of Classification Search
USPC ........ 323/282, 284; 363/15–17, 21.02, 21.03, 363/39–41, 97–98, 131–132, 127
See application file for complete search history.

(56) References Cited

U.S. PATENT DOCUMENTS

| | | | | |
|---|---|---|---|---|
| 5,717,584 A * | 2/1998 | Rajashekara | ....... | H02M 7/5387 363/132 |
| 6,344,979 B1 | 2/2002 | Huang et al. | | |
| 6,683,800 B2 * | 1/2004 | Loef | ...................... | H02M 3/337 363/17 |
| 7,279,665 B2 * | 10/2007 | Kagan | ...................... | H05B 6/04 219/635 |
| 7,411,377 B2 * | 8/2008 | Sutardja | ................ | H02M 1/088 323/282 |
| 8,629,627 B2 | 1/2014 | Cohen et al. | | |
| 8,681,520 B2 | 3/2014 | Tao | | |
| 8,717,784 B2 | 5/2014 | Park et al. | | |
| 8,848,399 B2 * | 9/2014 | Sagneri | ................. | H02M 3/158 363/21.02 |
| 2006/0018132 A1 * | 1/2006 | Price | ................. | H02M 7/53806 363/17 |
| 2006/0285366 A1 * | 12/2006 | Radecker | .......... | H02M 3/33507 363/16 |
| 2008/0130339 A1 * | 6/2008 | McDonald | ............ | H02M 7/217 363/127 |
| 2009/0244933 A1 | 10/2009 | Wang et al. | | |
| 2010/0033998 A1 * | 2/2010 | Halberstadt | ......... | H02M 3/3376 363/97 |
| 2010/0103710 A1 | 4/2010 | Reddy | | |
| 2011/0063881 A1 | 3/2011 | Dabak et al. | | |
| 2012/0176824 A1 | 7/2012 | Franklin et al. | | |
| 2013/0121033 A1 | 5/2013 | Lehn et al. | | |
| 2013/0194832 A1 | 8/2013 | Han et al. | | |
| 2013/0279205 A1 | 10/2013 | Keung | | |
| 2014/0016363 A1 * | 1/2014 | Chen | ..................... | H02M 3/335 363/21.02 |

OTHER PUBLICATIONS

McDonald et al., "Digital Control Provides LLC Performance Enhancements", Texas Instruments, Power Electronics, Aug. 5, 2013, 9 pgs.
Huang, "Designing an LLC Resonant Half-Bridge Power Converter", Power Supply Design Seminar, 2010, SEM1900, Topic 3, TI Literature No. SLUP263, available at powerti.com/seminars, 30 pgs.
UCD3138 Highly Integrated Digital Controller for Isolated Power, Data Manual, Texas Instruments, Literature No. SLUSAP2F, Mar. 2012, Revised Nov. 2013, 78 pgs.

* cited by examiner

*Primary Examiner* — Adolf Berhane
*Assistant Examiner* — Nusrat Quddus
(74) *Attorney, Agent, or Firm* — William B. Kempler; Frank D. Cimino (57) ABSTRACT

Methods, control apparatus and series resonant or LLC power conversion systems are presented in which a resonant series circuit current is compared with a threshold during a portion of a modulation switching cycle following turn on of a corresponding switching device and one or more indications or remedial actions are undertaken to modify modulation control of a switching circuit in response to a determination that the resonant current is below the threshold to facilitate our promote zero voltage switching or near-zero voltage switching and provide current reversal protection.

22 Claims, 10 Drawing Sheets

LLC CONVERTER AND LOSS OF INDUCTIVE MODE DETECTION CIRCUIT

FIELD OF THE DISCLOSURE

The present disclosure relates to control of LLC and other series resonant converters to promote zero voltage switching.

BACKGROUND

LLC converters are a form of series resonant converters having a series resonant circuit including a transformer primary winding in which a switching circuit is used to alternately couple a switching node of a resonant circuit or tank circuit to a positive supply node or a ground node to provide an alternating resonant current flow through the transformer primary winding. A secondary circuit, such as a rectifier, provides an output voltage to drive a load, with the switching circuit operation being adjusted to regulate the output voltage. Series resonant converters can operate in a so-called inductive mode or in a capacitive mode depending on the operating frequency and impedances of the resonant circuit and the secondary circuit, with the impact of the output rectifier and any associated filter circuitry being reflected back into the primary resonant circuit through the turns ratio of the transformer, whereby the load impedance including the secondary circuitry is essentially in series with the resonant circuit. Frequency control of the switching circuit can be used to regulate an output condition (e.g., output voltage, output current, etc.) based on one or more feedback signals, where the resonant circuit impedance is minimized at a resonant frequency. LLC converters provide a resonant inductance, typically an inductor connected in series with the transformer primary winding and a resonant circuit capacitance, as well as a magnetizing inductor in the series circuit, with LLC resonant converters typically having two resonant frequencies. Operation at the higher resonant frequency advantageously facilitates regulation of a wide load range with minimal frequency adjustment.

LLC converters are preferably designed to operate in an inductive region with the resonant circuit current lagging the voltage. The lagging current operation in the inductive region facilitates zero-voltage-switching (ZVS) on the MOSFETs or other switching devices used in the series resonant converter, thereby enhancing system efficiency while mitigating switch degradation. However, certain operating conditions may change the resonant circuit operation toward the capacitive region, thereby inhibiting zero voltage or near-zero voltage switching operation. As a result, operation in the capacitive region is undesirable, and may lead to current reversal stresses on the switching components. Although operating frequency, resonant circuit component values and other system design parameters can be tailored to help prevent or minimize operation in the capacitive region, input voltage brownout or other drops in input voltage and/or output current overload conditions may cause a circuit to operate in the capacitive region, which can lead to undue stress on the switching devices. Also, certain circuit configurations may be subject to capacitive mode operation at startup before resonant circuit capacitors are fully charged to a steady state value. Thus, capacitive region operation reduces system efficiency, and may in some cases lead to degradation or damage to the switching devices. Accordingly, a need remains for improved control apparatus and techniques to promote zero voltage switching or near-zero voltage switching and mitigate operation in the capacitive region for LLC and other series resonant converters.

SUMMARY

Various aspects of the present disclosure are now summarized to facilitate a basic understanding of the disclosure by briefly indicating the nature and substance of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Power conversion systems, control apparatus therefore, and methods are disclosed. The power converter includes a resonant circuit with a series circuit having one or more inductances, a transformer primary winding and at least one capacitance coupled in series between the switching node and a constant voltage node, with a switching circuit including two or more switching devices coupled between an input voltage node and the constant voltage node. A controller provides modulated switching control signals to control a voltage of a switching node of the switching circuit to control a converter output. The switching circuit is operated by modulated switching control signals from the controller in a series of switching cycles, and a sensing circuit provides a sense signal representing a resonant current flowing in the series circuit. A detection circuit selectively provides a detection signal or value to the controller indicating potential onset of capacitive region operation or loss of inductive region operation if the sense signal falls below a predetermined threshold in a predetermined portion of a given modulation half cycle. In response to receiving the detection signal or value, the controller selectively modifies the switching control signals, for example, to increase the operating frequency to promote zero voltage switching or near-zero voltage switching operation of the switching devices.

The predetermined half cycle portion in certain embodiments begins a certain non-zero time after a given switching device is turned on and ends before that switching device is turned off in order to avoid false tripping for expected zero crossings during current reversal each half cycle of the resonant circuit operation. The detection circuit in certain embodiments may be implemented using a comparator to receive the sense signal and a voltage reference, with a timing circuit selectively providing the detection signal or value to the controller if the comparator output is asserted during the predetermined portion of the given half cycle. In certain implementations, a processor-implemented controller and detection circuit receive a sense value from an analog to digital converter and selectively modify the switching control signals in response to the sense value being less than the predetermined threshold in the predetermined portion of the given half cycle. The predetermined threshold may be an adjustable value stored in an electronic memory in certain embodiments, thus allowing a modulation controller product to be individually configured to prevent or inhibit capacitive region operation for a variety of different series resonant converter applications.

In certain embodiments, moreover, a second detection circuit is operative to provide a loss of zero voltage switching detection signal or value to the controller for selective adjustment of modulation dead times, with the second detection signal or value being provided if the amplitude of the sense signal is below a second predetermined threshold at a nonzero predetermined time after the given switching device is turned on. By this operation, conditions tending toward a loss of zero voltage switching can be identified and remedial action taken without waiting for damage or degradation to MOSFETs or other switching devices of the power converter. This, in turn, may facilitate maintenance of zero voltage switching over a wider operation range while providing improved dead time in higher system efficiency.

Methods for resonant power converter control are provided in accordance with further aspects of the disclosure, including sensing a resonant current flowing in a series circuit, determining whether the resonant current is below a predetermined threshold in a predetermined portion of a given modulation half cycle, and if so, selectively modifying one or more modulation switching control signals to promote zero voltage switching or near-zero voltage switching operation of the switching device.

DESCRIPTION OF THE DRAWINGS

The following description and drawings set forth certain illustrative implementations of the disclosure in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

One or more embodiments or implementations are hereinafter described in conjunction with the drawings, wherein like reference numerals are used to refer to like elements throughout, and wherein the various features are not necessarily drawn to scale.

Figure 1:
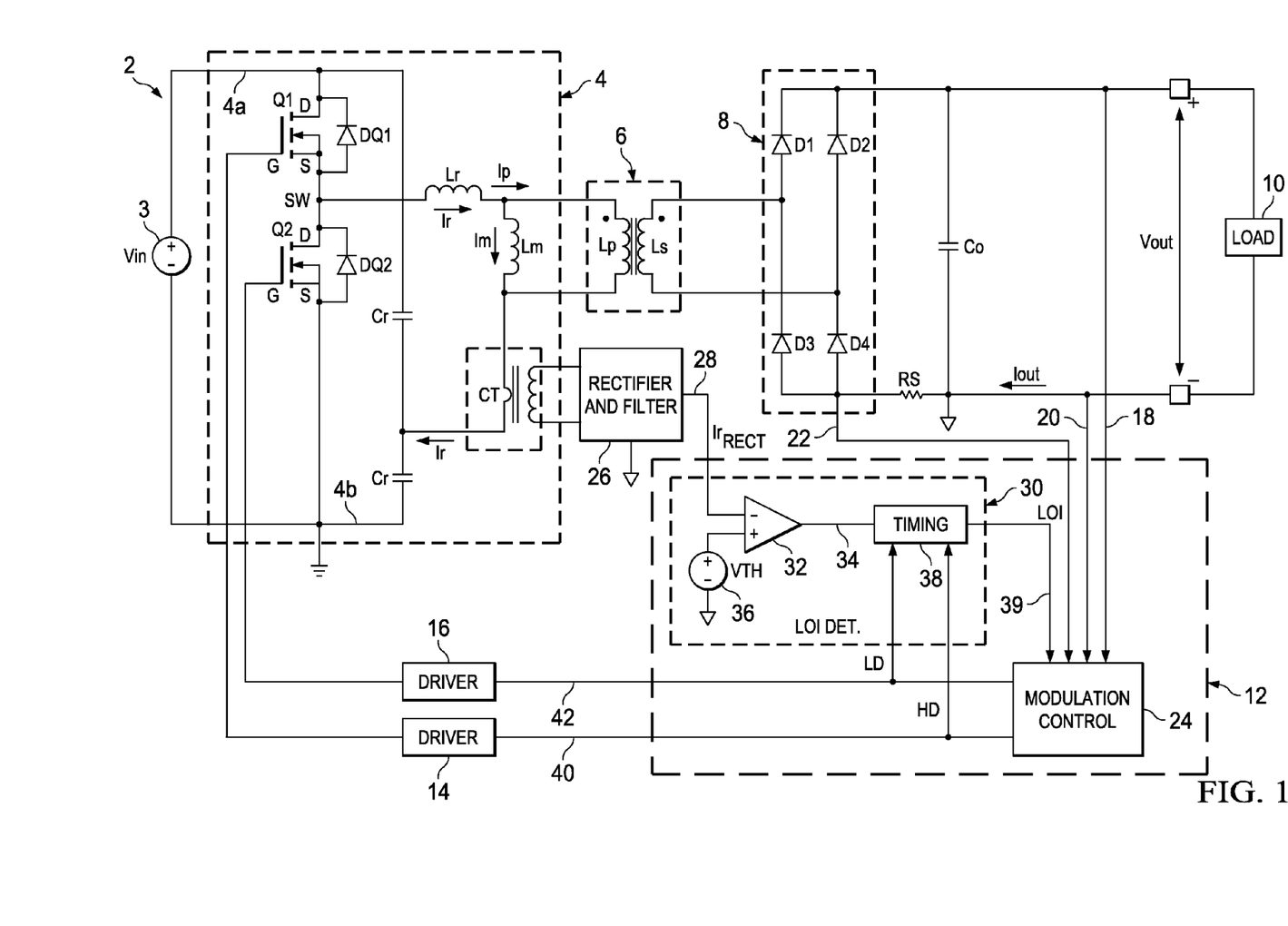
FIG. 1 is a schematic diagram illustrating a half bridge LLC converter circuit embodiment with a loss of inductive operation detection circuit.

FIG. 1 illustrates a power conversion system embodiment 2 having a loss of inductive operation (LOI) detection circuit. The system 2 includes a half bridge converter with a resonant circuit 4 including a switching circuit receiving a DC input voltage (Vin) from a power source 3. The resonant circuit 4 provides an alternating primary current Ip to a primary winding Lp of a transformer 6 whose secondary winding Ls is connected to a passive full bridge rectifier circuit 8 having diodes D1, D2, D3 and D4 and an output capacitor Co providing a regulated DC output voltage Vout with an output current Tout via positive (+) and negative (−) terminals for driving a connected load 10.

A control apparatus 12, in one example a modulation controller integrated circuit (IC), provides modulated switching control signals via high and low side driver circuits 14 and 16 to operate the corresponding high and low side switching devices Q1 and Q2, respectively forming a switching circuit of the resonant circuit 4. Any suitable form of modulation can be used, such as frequency modulation, pulse width modulation, etc. The switching circuit in this example is a half bridge configuration formed by Q1 and Q2, although full bridge circuits and other switching circuit architectures can be used to actuate alternating operation of a series resonant circuit to provide alternating current to the transformer primary winding Lp in various embodiments. Moreover, while N-channel MOSFET devices Q1 and Q2 are shown in the illustrated embodiment, P-channel MOSFETs can be used, or combinations of N-channel and P-channel switches can be employed, and other forms of semiconductor-based switching devices can be used (e.g., IGBTs, bipolar devices, etc.). In the illustrated embodiment, the gate terminals G of the switches Q1 and Q2 are respectively connected to the corresponding driver circuits 14 and 16, with a source S of Q1 being connected to a drain D of Q2 at a switching node SW. In this embodiment, moreover, a first diode DQ1 is provided with an anode connected to the switching node SW and a cathode connected to a positive resonant circuit input node 4a, and a second diode DQ2 having an anode connected to a constant voltage node 4b, in this case a ground or negative terminal of the power supply 3, and a cathode connected to the switching node SW as shown.

The resonant circuit embodiment 4 of FIG. 1 includes a series circuit coupled between the switching node SW and the constant voltage node 4b, generally in parallel with the low side driver Q2. The series circuit in this case includes a separate resonant inductor Lr, the transformer primary winding Lp, a primary winding of a current transformer CT, and a pair of resonant capacitors Cr, with an upper resonant capacitor Cr connected between the lower terminal of the current transformer primary and the positive input node 4a and a lower resonant capacitor Cr connected between the current transformer CT and the constant voltage node 4b. While the resonant capacitance in the illustrated embodiment is implemented using two capacitors Cr connected as shown, other embodiments are possible in which the upper resonant capacitor Cr can be omitted, with a single resonant capacitor Cr connected to the constant voltage load 4b to complete the series circuit. In certain embodiments, moreover, the resonant inductance Lr need not be a separate inductor as shown, and may be provided by the inductance of the transformer primary winding Lp for series resonant operation in steady state. Furthermore, the illustrated resonant circuit 4 provides an LLC converter including a separate magnetizing inductor Lm in parallel with the transformer primary winding Lp. As shown, a resonant current Ir flows in the series circuit, and can be detected via connection of the primary winding of the current transformer CT in the lower series circuit branch as shown. Other configurations are possible, for example, in which a current sensor, such as the illustrated current transformer CT can be connected in the upper circuit branch, for example, before or after the resonant inductor Lr. Moreover, the resonant capacitance Cr can alternatively be connected in other locations in the series circuit, for example, either before or after the resonant inductor Lr. In the illustrated architecture, the resonant current Ir includes a primary current Ip flowing in the transformer primary winding Lp, as well as a magnetizing current Im flowing in the magnetizing inductor Lm.

In normal operation, a modulation control component 24 of the control apparatus 12 receives one or more feedback signals or values representing the output condition of a driven load 10, in this case, an output voltage signal (representing Vout) obtained via lines 18 and 20, as well as an output current signal (representing Iout) obtained via any suitable current sensing apparatus, such as a sense resistor RS connected a shown between the − output terminal and the anodes of the rectifier diodes D3 and D4, with the controller 24 receiving a voltage signal representing the output current along lines 22 and 20 as shown. The controller 24 can be any suitable analog and/or digital circuitry, and may be implemented via a programmed processor in certain embodiments, and the controller 24 provides high drive and low drive switching control signals HD and LD, respectively, via lines 40 and 42 to the corresponding high and low side driver circuits 14 and 16 for operating the switching circuit of the converter 2. In the illustrated example, the modulation controller 24 is integral to the controller IC 12, although other embodiments are possible in which the modulation control circuit 24 is a separate device. In operation, the controller 24 provides the HD and LD switching control signals in alternating fashion such that only one of the switches Q1 and Q2 is on at any given time, and preferably provides nonzero dead times during which neither of the devices Q1 or Q2 is on. Moreover, the controller 24 provides closed loop modulation in order to regulate the output conditions at the load 10 by selectively adjusting the duty cycles of the switching control signals HD and LD according to any suitable form of closed loop modulation regulation techniques. In this regard, any suitable driver circuitry 14, 16 can be used by which the output signals HD and LD from the modulation controller 24 are operatively interfaced with the switching devices Q1 and Q2 to drive suitable gate control signals for selectively turning the devices Q1, Q2 on or off, where certain implementations of a controller integrated circuit 12 can include integral driver circuitry 14, 16, or separate driver circuits can be used in other embodiments.

In the illustrated embodiment, for N-channel MOSFET devices Q1 and Q2, a logic high gate control signal will turn the device on, and a low signal will turn the device off. In this manner, when Q1 is activated by a logic high gate control signal from the driver 14, the switching node SW is coupled with the upper input node 4a, and the node SW is decoupled from the upper input 4a when Q1 is off. Similarly, a logic high output from the low side driver circuit 16 turns on Q2, thereby coupling the switching node SW with the constant voltage node 4b, and a low signal from the driver 16 decouples the SW node from the constant voltage node 4b. In this manner, the alternating provision of the switching control signals HD and LD by the modulation controller 24 selectively modifies the voltage at the switching node SW in order to generate an alternating current flow Ip in the transformer primary winding Lp to control the converter output voltage Vout. Furthermore, in a typical configuration, one or more transformer elements may be included between the modulation controller 24 and the switching circuit Q1, Q2, in order to provide isolated switching control, wherein the "−" output terminal of the converter 2 may be at a different potential than the constant voltage node 4b and may be isolated with respect to the input power supply 3.

Figure 2:
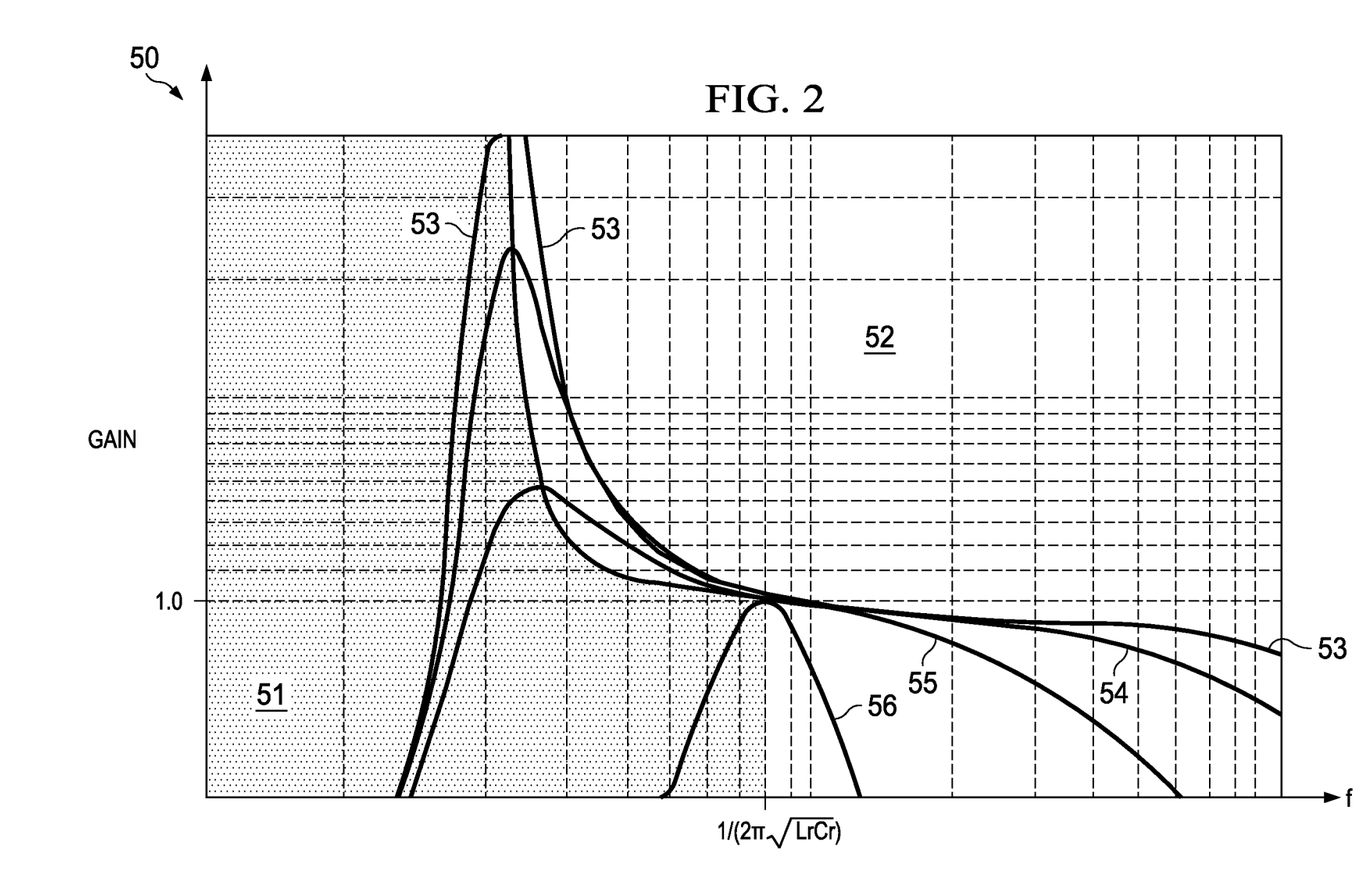
FIG. 2 is a graph illustrating gain curves for different example loading conditions as a function of LLC converter operating frequency, showing a capacitive operation region and an inductive operation region.

Referring to FIGS. 2-5, series-resonant and LLC converters are preferably operated in an inductive region 52 shown in a graph 50 of FIG. 2, whereas operation in a capacitive region 51 (shown in diagonal dashed lines in FIG. 2) is less desirable with respect to zero voltage switching operation of the converter switches Q1 and Q2. In particular, when the load seen at the switching node SW is inductive, the current through the inductor Lr lags the voltage. Turning off the upper switching device Q1 discontinues current flow between the switching node SW in the upper input node 4a. For a lagging current, the resonant current Ir flowing into the resonant inductor Lr continues to flow for some time after Q1 is turned off, and this current flows through a body diode of Q2, or through the illustrated diode DQ2. Flow of this diode current turns on (i.e., forward biases) the corresponding body diode or DQ2, thereby ensuring that when Q2 is subsequently turned on via the modulation controller 24 (after the dead time), the drain to source voltage of Q2 is at or near 0 V (e.g., typically less than one volt due to the forward biased diode). A similar situation occurs when Q2 is turned off for lagging current (inductive region) operation with the body diode of Q1 being forward biased to limit the drain to source voltage of Q1 when it is subsequently turned on. In contrast, if the load at the switching node SW is primarily capacitive (region 51 in FIG. 2), a lagging voltage leads to the associated switching device diode (external diode or body diode) being reverse biased when the device is turned on, which reduces the efficiency of the power conversion system 2 and may degrade or stress the switching devices Q1 and Q2.

FIG. 2 illustrates example gain curves 53, 54, 55 and 56 (e.g., Vout/Vin) for correspondingly increasing output load currents as a function of the modulation switching frequency, showing a first (higher) LLC converter circuit resonant frequency defining the boundary between the capacitive region 51 and the inductive region 52 for unity or lower gain. Above unity gain for the LLC converter 2, the boundary between the capacitive region 51 and the inductive region 52 corresponds to a lower circuit resonant frequency at which the various gain curves 53-56 undergo a local maxima. As seen, operation in the inductive region 52 is ensured for operation above the higher resonant frequency, and at lower frequencies for a given load condition between the upper and lower resonant frequencies. However, operation in the capacitive region 51 leads to reduced gain and mitigates or defeats zero voltage switching or near-zero voltage switching.

Figure 3:
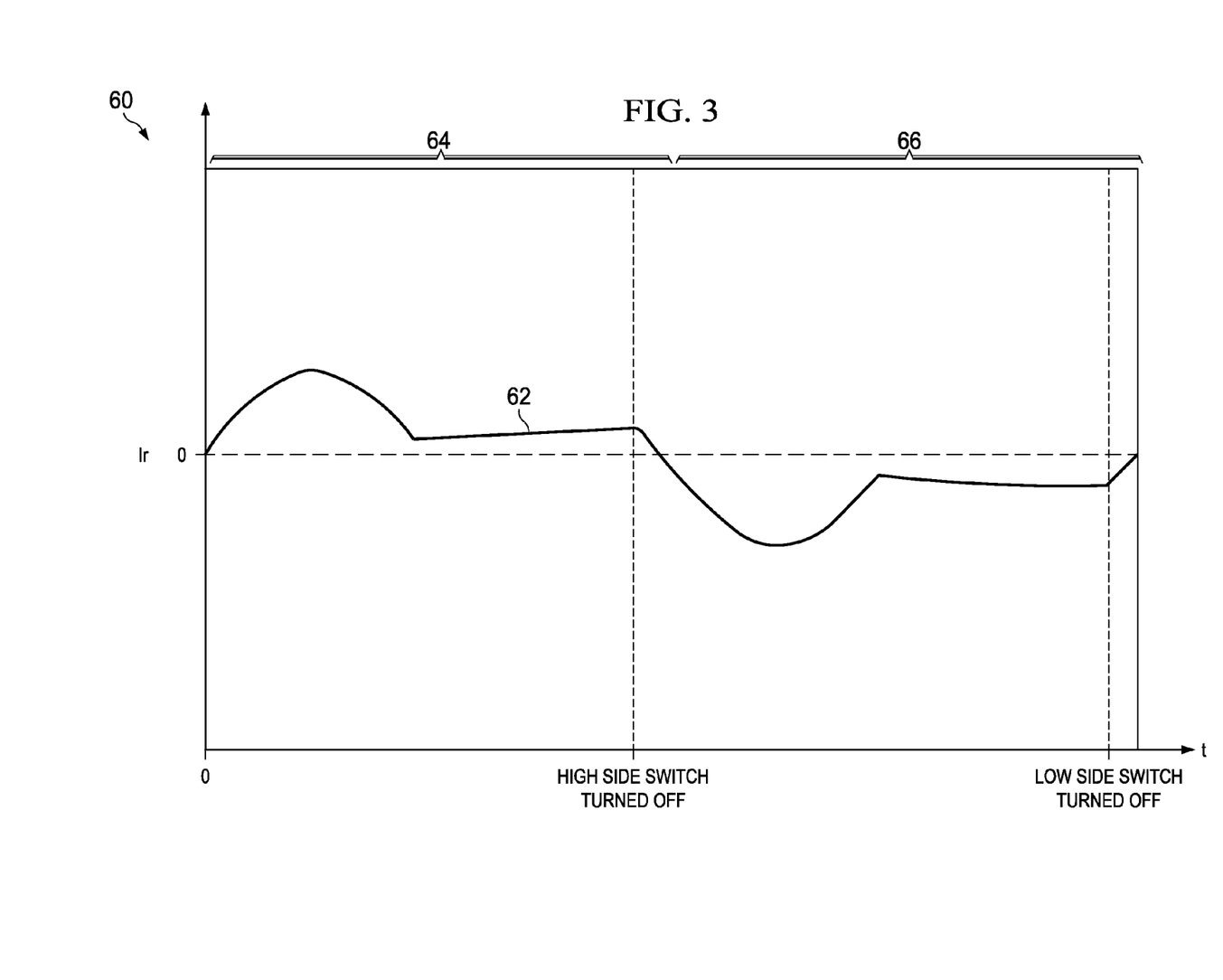
FIG. 3 is a graph illustrating resonant current over a complete cycle of the LLC converter during operation in the inductive operating region.
Figure 4:
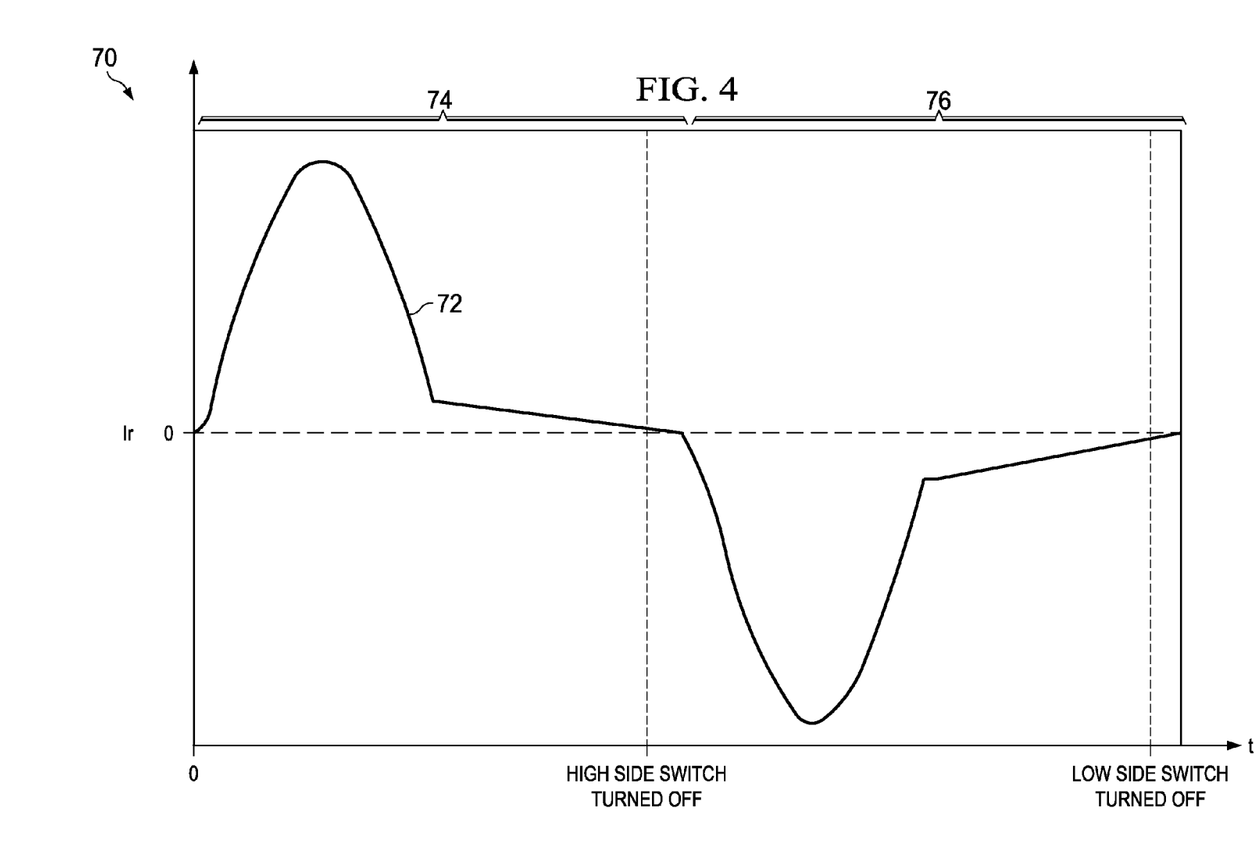
FIG. 4 is a graph illustrating resonant current during LLC converter operation approaching the capacitive region.
Figure 5:
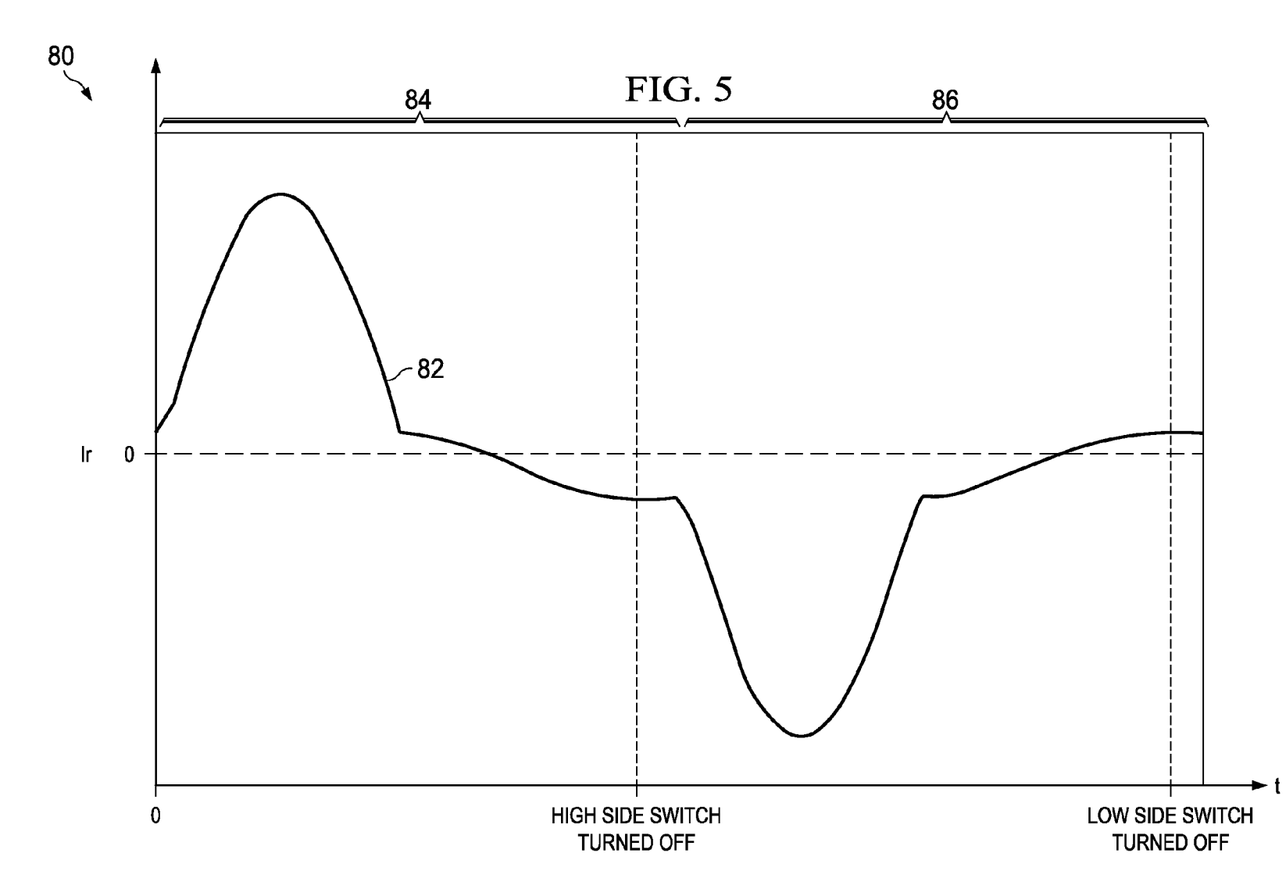
FIG. 5 is a graph illustrating the resonant current during operation in the capacitive region.

FIGS. 3-5 respectively illustrate graphs 60, 70 and 80 showing resonant circuit current curves 62, 72 and 82 over a single modulation switching cycle in the converter 2 at various conditions at or near the conductive region 51. In a first half cycle 64 in FIG. 3, for example, operation in the inductive region shows the resonant current curve 62 initially rising when the high side switching device Q1 is turned on, and the current 62 remains positive when the high side switch is turned off, shown by the first dashed line in the figure. The current then crosses through zero and the low side switching device Q2 is turned on in the second half cycle 66, with the low side switch Q2 also being turned off when the current is non-zero (shown at the second dashed line in FIG. 3). FIG. 4 shows a graph 70 including first and second half cycles 74 and 76 for operation at a higher loading condition (and/or a lower input voltage condition) generally at or near the boundary between the capacitive region 51 and the inductive region 52 in FIG. 2. As seen in FIG. 4, the resonant current 72 is nearly zero when the respective high and low side switching devices are turned off, where the amount of current flow at the switching points may not be enough to forward bias the corresponding body diode, thus leading to reverse recovery situations to discharge energy in the drain to source capacitance of the corresponding switch. In FIG. 5, the resonant current 82 crosses zero well before the high and low side switching devices Q1 and Q2 are respectively turned off in the half cycles 84 and 86 for operation in the capacitive region 51, thus exacerbating the potential for high reverse recovery loss damage or degradation, and significantly reducing the efficiency of the conversion system 2.

Referring again to FIG. 1, a detection circuit 30 (LOI detector) is implemented in the IC 12, and operates to provide a loss of inductive region operation (LOI) signal via line 39 to the modulation controller 24 based at least partially on the high and low driver signals HD and LD, and on a signal $Ir_{RECT}$ received via line 28 from a rectifier and filter circuit 26 connected to the secondary winding of the current transformer CT as shown. In certain embodiments, the modulation controller 24 responds to receipt of the LOI signal by selective modification of the modulation control of the switches Q1 and Q2, for example, by decreasing the modulation switching frequency. This advantageously provides proactive movement of operation away from the capacitive region 51 (e.g., moves control to the right in the graph 50 of FIG. 2 above) in response to an indication that the system 2 is operating in or near the capacitive region 51. Any suitable rectifier circuit 26 can be used, with the output signal $Ir_{RECT}$ generally representing the absolute value or a scaled absolute value of the resonant circuit current Ir, where additional filter circuit components can be included within the rectifier circuit 26 in certain embodiments.

Figure 6:
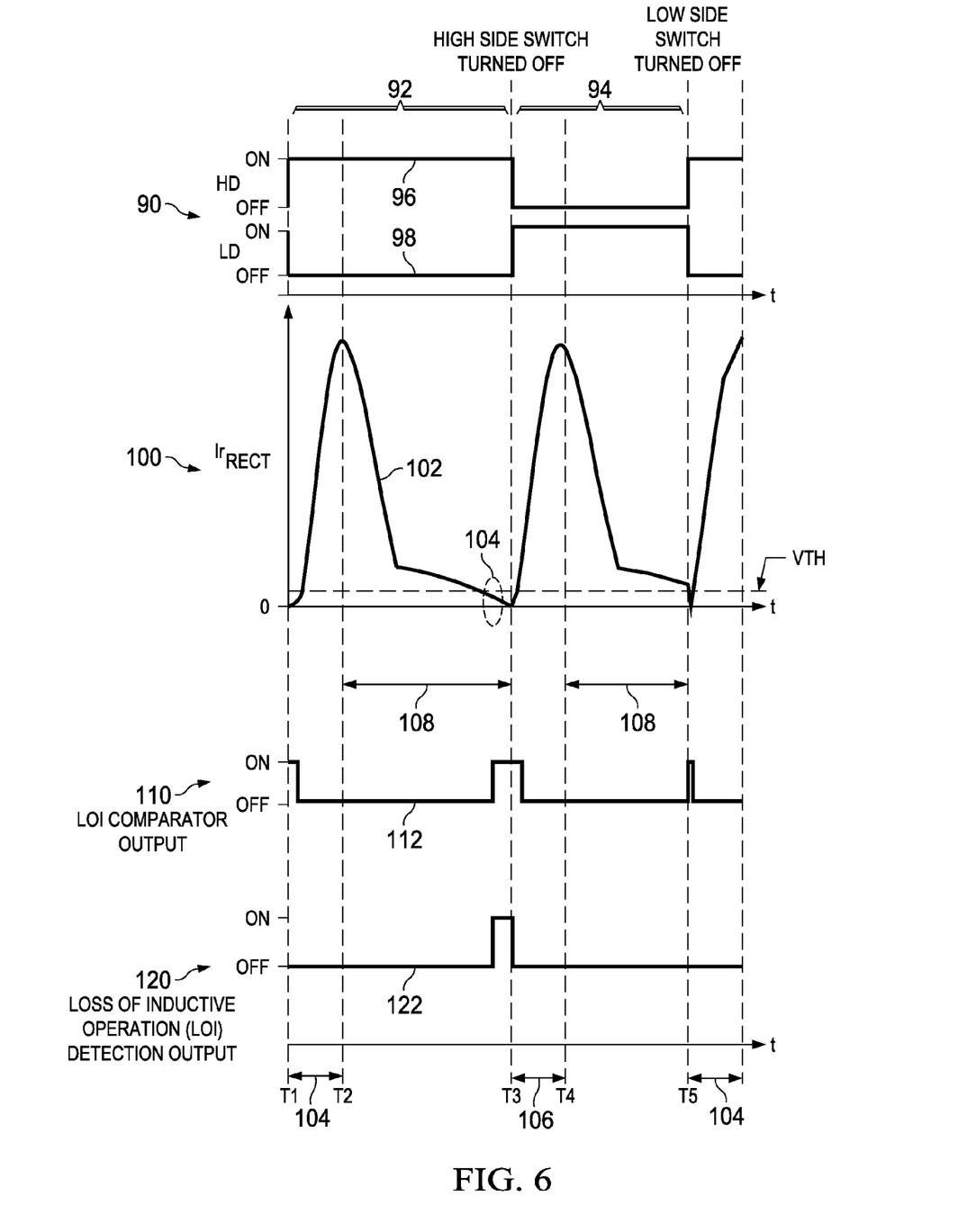
FIG. 6 is a graph illustrating various waveform diagrams in the LLC converter and the loss of inductive operation detection circuit.

Referring also to FIG. 6, the detection circuit 30 in FIG. 1 includes a comparator 32 with an inverting input (−) receiving the rectifier output signal $Ir_{RECT}$ and a non-inverting input (+) receiving a threshold voltage signal VTH from a voltage reference 36. The comparator output 34 provides a signal to a timing or blanking circuit 38 which operates to provide a loss of inductive operation (LOI) detection signal or value via line 39 to the modulation controller 24 when the comparator output 34 is active (e.g., active HIGH in one embodiment) during a predetermined portion of a given half cycle. In operation, the illustrated modulation controller 24 selectively modifies the switching control signals HD, LD in response to receiving the detection signal or value in a first state, such as an active high state in the illustrated embodiments. The timing circuit 38, in this regard, selectively asserts the LOI signal if the comparator output 34 indicates that the rectifier output signal $Ir_{RECT}$ is less than the voltage reference VTH during a non-zero predetermined temporal portion of a given half cycle of the modulation switching cycle implemented by the controller 24 (e.g., during portions 108 of half cycles 92 and 94 in FIG. 6).

FIG. 6 illustrates a graph 90 showing example high and low side switching control signals 96 and 98 (HD and LD) during first and second half cycles 92 and 94, with the switch turnoff times indicated as dashed lines in the figure. In addition, graph 100 in FIG. 6 shows a rectified resonant current signal curve 102 representing the output on line 28 from the rectifier and filter circuit 26 of FIG. 1 above. A graph 110 in FIG. 6 illustrates the LOI comparator output 112 on line 34 from the output of the comparator 32 in the detection circuit 30 of FIG. 1, and a graph 120 in FIG. 6 shows a curve 122 indicating the LOI detection circuit output provided to the modulation controller 24 via line 39 in FIG. 1. In this example, the illustrated switching cycle begins at time T1, and the high side switching device Q1 is turned off at time T3, after which the low side switching device Q2 is turned on and remains on until time T5 to define first and second half cycles 92 and 94, which in this case are not of equal duration as described further below. In particular, the LOI detection circuit 30 of FIG. 1 asserts the LOI detection signal on line 39 in response to the rectified current signal curve 102 transitioning below a first threshold voltage level of VTH indicated at 104 in the graph 100 of FIG. 6. This transition of the rectified resonant current signal waveform 102 below the threshold VTH occurs during a predetermined portion 108 of the first half cycle 92.

In operation, the illustrated modulation controller embodiment 24 selectively modifies the switching control signals HD, LD in response to receiving the LOI detection signal or value in a first state, such as an active high state in the illustrated embodiments. Any suitable form of modulation signal modification can be performed by the controller 24 in response to receipt of the LOI signal on line 39, with the illustrated embodiment selectively increasing the modulation switching frequency (thereby decreasing the switching period) in response to assertion of the LOI signal. Outside of the predetermined regions 108 in FIG. 6, the timing circuit 38 performs "blanking" operation thereby preventing assertion of the LOI detection signal. In particular, the blanking regions 104 and 106 shown in FIG. 6 correspond to times immediately following turn on of the corresponding switch Q1, Q2, where the resonant current Ir is expected to transition through zero and the corresponding rectified signal $Ir_{RECT}$ is thus expected to be at or near zero simply due to the current reversal each half cycle in the normal operation of the resonant circuit 4. In the illustrated example, the blanking or timing circuit 38 implements the blanking regions 104 and 106 so as to selectively monitor the resonant current levels during the predetermined portions 108 beginning in this case at times T2 and T4 at extending through corresponding non-zero predetermined times (e.g., T3-T2, T5-T4) after the corresponding switching device Q2, Q1 is turned on (e.g., turn on essentially at T1, T3) and ending at times T3, T5 before the corresponding switching device is turned off. In this manner, the timing circuit 38 advantageously asserts the LOI signal to the modulation controller 24 only if the comparator output on line 34 is asserted indicating the rectified current is below the predetermined threshold VTH during the predetermined half cycle portions 108 when the current is not otherwise expected to be at or near zero. The detection circuit 30 in this example thus selectively provides the signal LOI to indicate to the controller 24 that operation of the resonant converter 2 is at or near the capacitive region 51 in FIG. 2, while avoiding false tripping or false actuation of the LOI signal in the blanking regions 104, 106.

Accordingly, the responsive modification of the modulation control signals HD, LD by the controller 24 is selective and attempts in certain implementations to modify the circuit operation away from the capacitive region 51 to avoid or mitigate degradation of the switching devices Q1 and Q2, and thus to promote or facilitate zero voltage switching or near-zero voltage switching operation. As seen in FIG. 6, for instance, the comparator output 112 goes high during the blanking intervals 104, but this does not trigger assertion of the LOI signal 122 until the occurrence (104 in the graph 100) of the transition of the rectified current signal 102 below the threshold VTH during the predetermined portion 108 of the first half cycle 92, thus causing the LOI signal 122 to be asserted (HIGH) as shown in the graph 120. In response, the modulation controller 24 of FIG. 1 in this embodiment shortens the time before the low side switching device Q2 is turned off at T5, whereby the second half cycle 94 in this embodiment is shorter than the first half cycle 92 and the switching frequency of the converter is increased. Assuming the conditions that brought upon the transition toward the capacitive region 51 were transient and are no longer present after this responsive action by the controller 24, the closed loop operation of the system 2 to regulate the output voltage Vout at the load 10 (FIG. 1) will tend to decrease the switching frequency back to a steady state operating point. As seen, therefore, the detection circuit 30 and the modulation controller 24 facilitate avoidance of capacitive region operation without requiring system shutdown. In other possible embodiments, the controller 24 can take any suitable remedial or proactive action in response to the LOI signal on the line 39, including without limitation system reset or shutdown, possibly after one or more attempts at self recovery through frequency increase. In certain embodiments, the threshold voltage VTH provided from the voltage reference 36 can be a constant reference, or adjustable references may be used.

Figure 7:
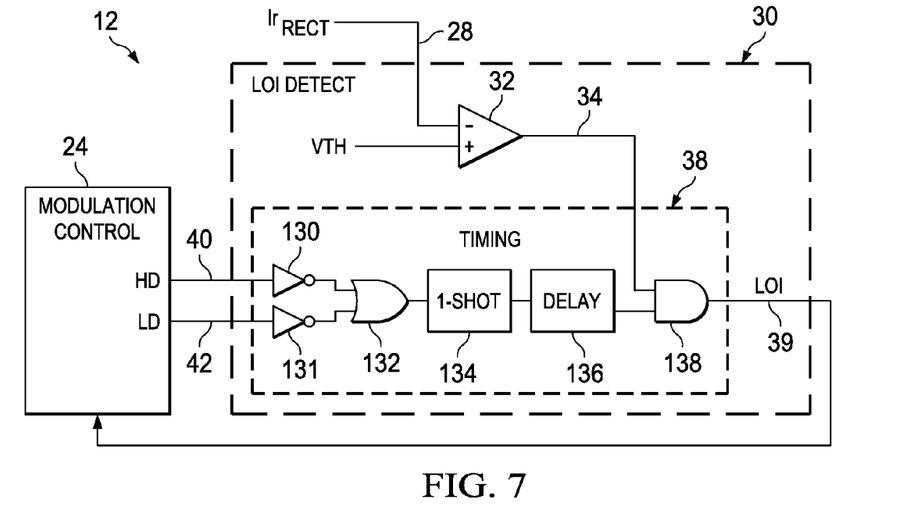
FIG. 7 is a schematic diagram illustrating a first circuit embodiment of a loss of inductive operation detection circuit with a comparator and blanking circuitry to provide a detection output signal to a modulation control circuit.

FIG. 7 illustrates a circuit embodiment of the LOI detection circuit 30, in which the timing/blanking circuit 38 includes inverters 130 and 131 connected via lines 40 and 42 to receive the HD and LD switching control signals from the controller 24, with the inverter outputs being connected to inputs of an OR gate 132. The OR gate output is provided as an input to a 1-shot circuit 134 whose output is provided to a delay circuit 136 in order to generate an output signal that is asserted a predetermined time following assertion of either of the HD or LD signals by the controller 24. The output of the delay circuit 136 is provided as an input to an AND gate 138 for gating the comparator output signal from the comparator 32 which is provided as a second input to the AND gate 138. As seen in FIG. 6, the timing circuit 38 in this embodiment ensures that the LOI signal output remains low for a non-zero predetermined blanking time (e.g., T2-T1, and T4-T3) after the respective switching device Q1 or Q2 is turned on (e.g., at T1, T3 in the illustrated example), and selectively asserts the LOI signal (e.g., active HIGH in this case) if the comparator output signal is asserted (HIGH) after the non-zero predetermined time and before the given switching device Q1, Q2 is to be turned off. In this manner, the output of the AND gate 138 provides the LOI detection signal on line 39 to indicate detection of actual or near loss of inductive operation to the modulation controller 24. Any suitable circuitry can be used to implement a detection circuit 30, wherein the configuration of FIG. 7 is but one non-limiting example.

Figure 8:
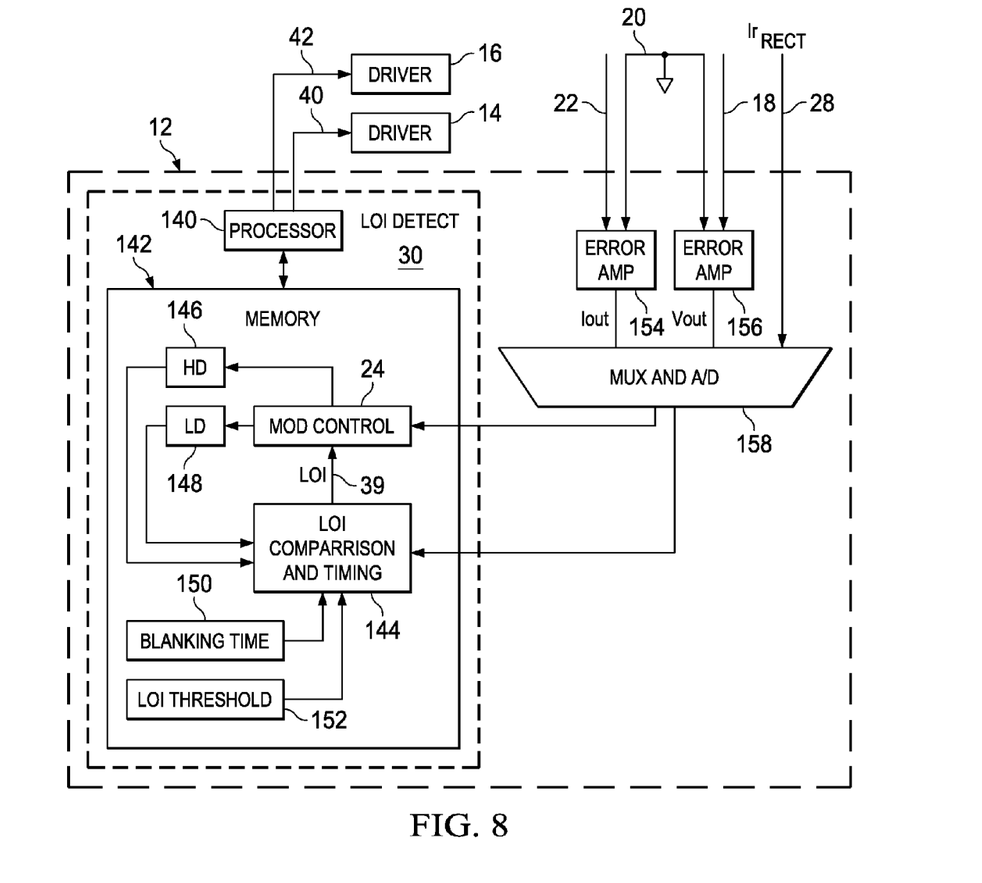
FIG. 8 is a schematic diagram illustrating a second embodiment of a loss of inductive operation detection circuit implemented using a processor.

FIG. 8 illustrates another possible embodiment, in which a modulation controller IC 12 includes a processor 140 with an associated electronic memory 142 implementing the LOI detection circuit 30 and the modulation controller 24 using corresponding instructions stored in the memory 142. In this case, the integrated circuit 12 provides outputs on lines 40 and 42 to the driver circuits 14 and 16, respectively, and the IC 12 further includes one or more error amplifier circuits 154 and 156 to provide analog signals representing the output current Tout and the output voltage Vout to a multiplexer and analog to digital (A/D) converter circuit 158. The A/D converter 158 provides corresponding values (e.g., digital values) to a modulation control component 24 implemented via the processor 140. In this case, moreover, the rectified resonant current signal $Ir_{RECT}$ from the rectifier circuit 26 is provided on line 28 to the multiplexer and A/D circuit 158, and a series of converted values corresponding to the rectified current signal are provided to an LOI comparison and timing component 144 implemented via the processor 140.

In addition, a predetermined blanking time value 150 and a predetermined LOI threshold value 152 are stored in the memory 142 for use by the LOI comparison and timing component 140 which provides an LOI signal or value (e.g., a flag) to the modulation control component 24. In operation, the controller component 24 is implemented by the processor 140 to provide the first and second switching control signals HD 146 and LD 148, which are provided as signal states to the drivers 14 and 16 for modulation of the switching circuit, and the switching control signal states 146 and 148 are also provided as inputs to the LOI comparison and timing component 144 as shown in FIG. 8. In this case, the comparison and timing component 144 is implemented by the processor 140 to compare the sense value based on conversion of the rectified signal provided on line 28 with the predetermined LOI threshold 152, for selective assertion of the LOI signal 39 to the modulation control component 24 except during a predefined or predetermined blanking time(s) 150.

In certain implementations, moreover, one or both of the predetermined threshold 152 and the predetermined half cycle portions defined by the blanking time 150 are adjustable. In this manner, a user may program the blanking time 150 and/or the LOI threshold 152 for a specific circuit application for use of the controller integrated circuit 12. In other possible embodiments, the modulation control component 24 may adaptively modify one or both of the blanking time value or values 150 and/or the LOI threshold 152 according to one or more circuit operating conditions.

Figure 9:
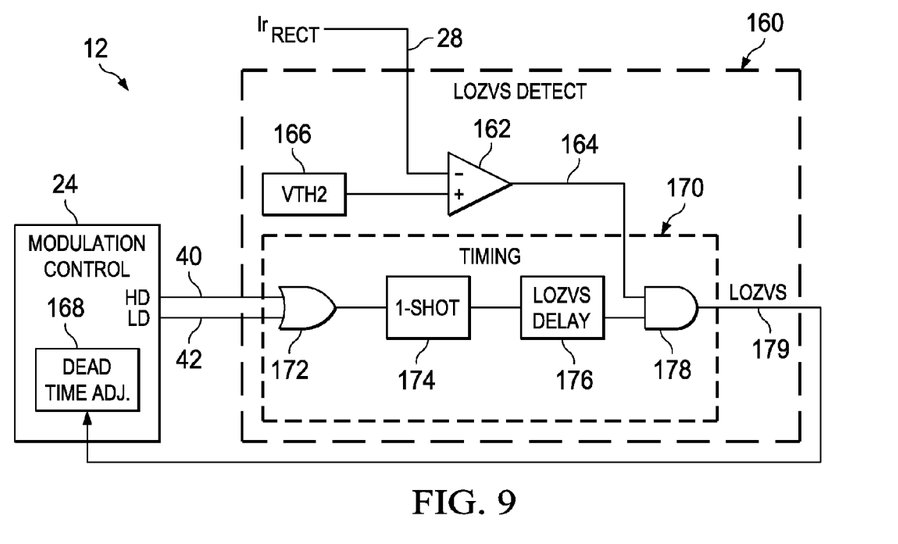
FIG. 9 is a schematic diagram illustrating a first embodiment of a loss of zero voltage switching detection circuit for dead time adjustment in a modulation controller.
Figure 10:
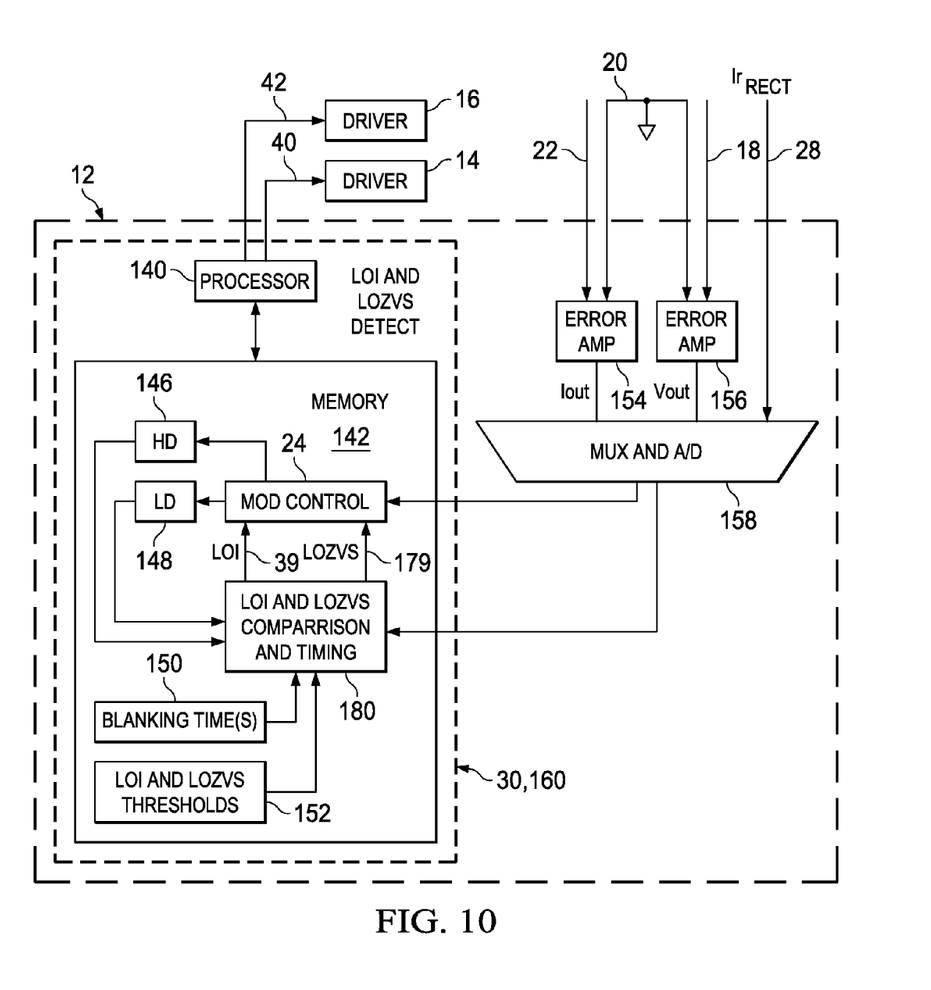
FIG. 10 is a schematic diagram illustrating a second embodiment of a loss of zero voltage switching detection circuit implemented using a processor.
Figure 11:
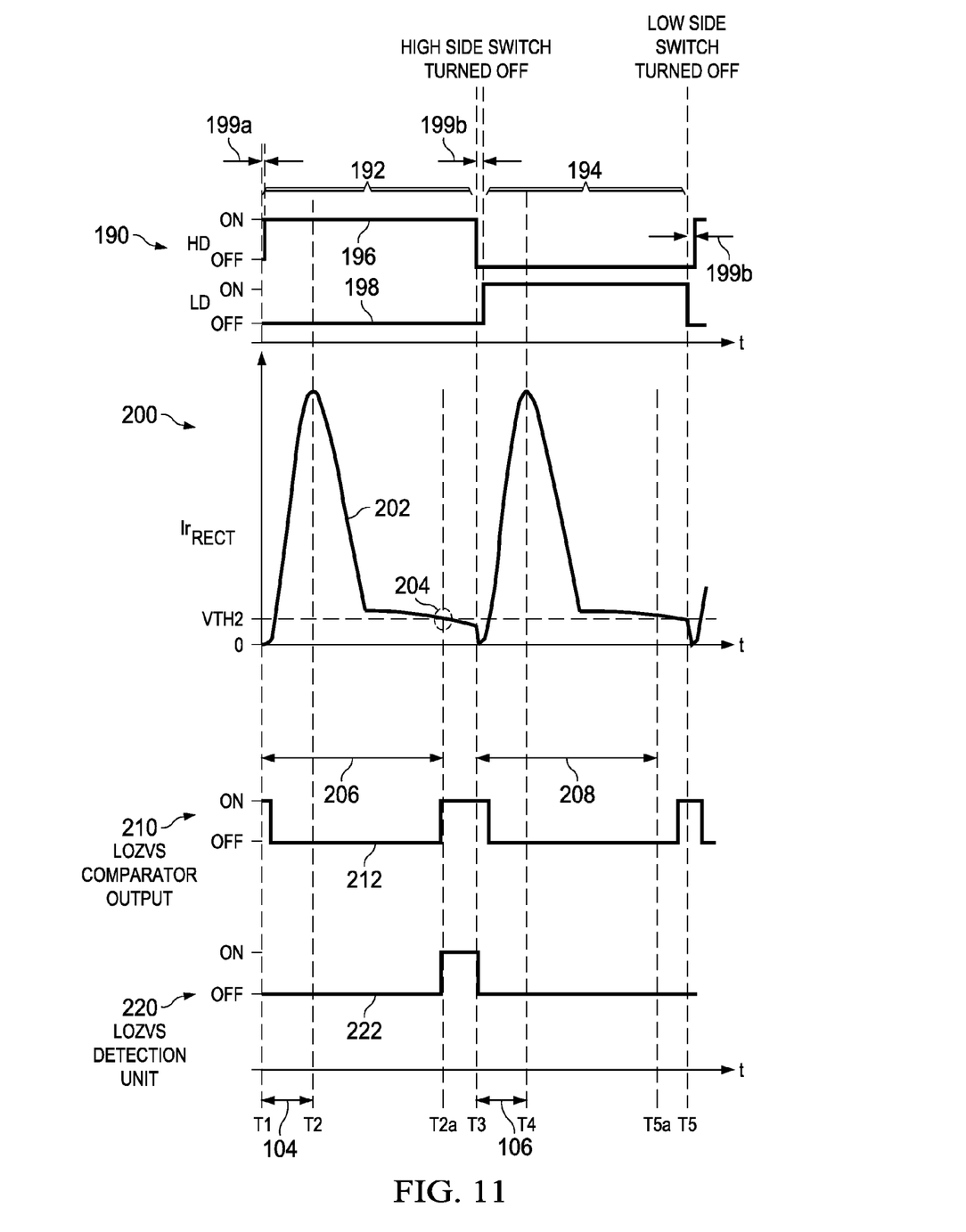
FIG. 11 is a graph illustrating various waveform diagrams in the LLC converter and the loss of zero voltage switching detection circuit.

Referring now to FIGS. 9-11, FIGS. 9 and 10 illustrate further embodiments in which a second detection circuit 160 is used to detect loss of zero voltage switching (LOZVS), or to identify conditions which indicate the potential for loss of zero voltage or near-zero voltage switching for protection of the switches Q1 and/or Q2. FIG. 9 shows a circuit example including a second comparator 162 receiving the rectified signal on line 28 from the rectifier circuit 26 of FIG. 1 at an inverting (−) input, and receiving a second threshold voltage VTH2 from a voltage reference 166 at a non-inverting (+) input. The comparator 162 provides a comparator output signal on line 164 as an input to an AND gate 178 whose output provides an LOZVS signal on line 179 to the modulation controller 24 for selective modification or adjustment of modulation switching dead times via a dead time circuit or component 168. In this case, the modulation controller 24 again provides the high and low switching control signals HD and LD on lines 40 and 42, which are received as inputs to an OR gate 172 of a timing circuit 170 in the detection circuit 160 as shown. The output of the OR gate 172 is provided as an input to a 1-shot circuit 174, which in turn provides an input to an LOZVS delay circuit 176 whose output is provided as a second input to the AND gate 178. In operation, the detection circuit 160 of FIG. 9 selectively provides the LOZVS signal on line 179 as a second detection signal or value to the controller 24 in a first state (e.g., active HIGH in one example) if the rectified signal $Ir_{RECT}$ is below a second threshold VTH2 represented by the voltage reference 166 at a second predetermined time (at time 206 or time 208 in FIG. 11) after a corresponding one of the switching devices Q1, Q2 is turned on, and otherwise the LOZVS detection signal remains low.

FIG. 11 provides graphs 190, 200, 210 and 220, where graph 190 illustrates the HD and LD switching control signals 196 and 198 during two example half cycles 192 and 194, graph 200 shows the rectified resonant current signal 202 and a second threshold VTH2, graph 210 shows the output curve 212 corresponding to the output outline 164 from the comparator 162, and the graph 220 shows the LOZVS detection output signal curve 222 as a function of time. FIG. 11 also illustrates the previously described blanking intervals 104 and 106 used for LOI detection, as well as second predetermined times 206, 208 following turn on of the respective first and second switching devices Q1 and Q2. For example, in the first half cycle 192 in FIG. 11, the predetermined time 206 is shown at a vertical dashed line at time T2a following Q1 being turned on at T1, and the second predetermined 208 at T5a is with respect to the low side switching devices Q2 being turned on. As further shown in the graph 190 in FIG. 11, the low side switching device Q2 is turned off a non-zero time 199a (dead time) prior to the high side switching device Q1 being turned on, with the modulation controller 24 implementing the dead time operation 199. In steady state operation, absent an indication of loss of zero voltage switching, the controller 24 in certain embodiments maintains a generally constant dead time 199. As seen in FIG. 11, however, when the rectified resonant current signal waveform 202 transitions below the second threshold VTH2 at 204 in the graph 200 (at the second predetermined time 206 following turn on of Q1), the modulation controller 24 is notified via assertion of the LOZVS detection output 22 going high in graph 220. In response, the modulation controller 24 selectively increases the dead time 199 for the subsequent half cycle 194, wherein the second and subsequent dead times 199b in FIG. 11 are of longer duration than the initial dead time value 199a. As a result, in the illustrated example, the rectified resonant current signal waveform 202 is above the threshold VTH2 at the relevant second predetermined time 208 at T5a. Thus, the selective dead time adjustment feature 168 implemented in the modulation controller 24, in combination with the selective LOZVS detection via the circuit 160 and the corresponding signal or value 179 advantageously performs proactive adjustment to mitigate or avoid loss of zero voltage switching or loss of near-zero voltage switching in the system 2.

FIG. 10 illustrates another possible non-limiting implementation of the LOZVS and LOI detection concepts via a processor 140 implemented in a modulation controller integrated circuit 12. In this case, the processor executes an LOI and LOZVS comparison and timing component 180 stored as processor-executable code in the electronic memory 142, along with one or more blanking time values 150 and thresholds 152 for use in LOI and LOZVS detection. In this embodiment, one or all of the blanking times 150 and thresholds 152 may be stored as values in the memory 142, and may be adaptively adjusted for example by the modulation control component 24 and/or may be user configurable. In operation, the LOI and LOZVS comparison and timing circuitry 180 operates as described above in connection with FIG. 8 for detection of loss of inductive region operation and further operates as previously described with respect to detecting real or anticipated loss of zero voltage switching or loss of near-zero voltage switching by determining whether the sensed value corresponding to the rectified resonant current is below the second threshold VTH2 at a predetermined second time (206, 208 in FIG. 11) following turn on of the corresponding resonant circuit switching device Q1 or Q2.

As discussed above, any suitable responsive action can be taken once a LOI or LOZVS condition has been detected. For LOI circumstances, the modulation controller 24 may selectively adjust the modulation switching control signals accordingly, for example, to shut down the operation of the switching circuit and/or to raise the switching frequency. In one alternate implementation, for example, the system may initially shut down and initiate a soft-start sequence beginning operation at a high frequency and slowly transitioning to a lower frequency, thereby preventing or inhibiting capacitive region operation. Similar or different actions can be taken on detection of operation at the threshold of losing zero voltage switching, and/or the system may selectively adjust the dead time value 199 in response to assertion of the LOZVS signal, thus facilitating more optimized dead-times and improved efficiency. In other possible embodiments, for example, the power supply is shut down and then restarted, or the active MOSFET is turned off and the next MOSFET turn on is delayed in the primary side bridge. The concepts of certain embodiments thus advantageously monitor and respond to the root cause of the MOSFET degradation, including current reversal in the resonant tank circuit, and thus provide benefits relative to other solutions that simply monitor the switch node voltage to determine if it is safe to turn a switching device on.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:
1. A power conversion system, comprising:
  a resonant circuit, comprising:
    a series circuit including at least one inductance, a transformer primary winding, and at least one capacitance coupled in series with one another between a switching node and a constant voltage node, and
    a switching circuit including first and second switching devices coupled with one another between an input voltage node and the circuit ground node, the first switching device coupled between the input voltage node and the switching node and operative in a first state to selectively couple the switching node with the input voltage node and in a second state to decouple the switching node from the input voltage node according to a first switching control signal, the second switching device coupled between the switching node and the constant voltage node and operative in a first state to selectively couple the switching node with the constant voltage node and in a second state to decouple the switching node from the constant voltage node according to a second switching control signal;
  a controller operatively coupled to provide the first and second switching control signals as modulated signals to the switching circuit in each of a plurality of switching cycles to modify a voltage at the switching node to control a converter output voltage;
  a sensing circuit operatively coupled with the series circuit to provide a sense signal representing a resonant current flowing in the series circuit; and
  a detection circuit operatively coupled with the sensing circuit to receive the sense signal and operative to selectively provide a detection signal or value to the controller in a first state if an amplitude of the sense signal is below a predetermined threshold in a predetermined portion of a given half cycle of a given one of the plurality of switching cycles and to provide the detection signal or value in a different second state if the amplitude of the sense signal is greater than or equal to the predetermined threshold in the predetermined portion of the given half cycle;

wherein the controller is operative to selectively modify the first and second switching control signals responsive to receiving the detection signal or value in the first state.

2. The power conversion system of claim 1, wherein the predetermined portion of the given half cycle begins a non-zero predetermined time after a given one of the first and second switching devices is turned on and ends before the given one of the first and second switching devices is turned off.

3. The power conversion system of claim 2, wherein the detection circuit comprises:

a comparator including a first input coupled to receive the sense signal from the sensing circuit, a second input coupled to a voltage reference representing the predetermined threshold, and a comparator output providing a comparator output signal in a first state if the amplitude of the sense signal is below an amplitude of the voltage reference and in a different second state if the amplitude of the sense signal is greater than or equal to the amplitude of the voltage reference; and a timing circuit operatively coupled to receive the first and second switching control signals from the controller and to receive the comparator output signal from the comparator, the timing circuit operative to provide the detection signal or value in the second state for the non-zero predetermined time after the given one of the first and second switching devices is turned on, and to selectively provide the detection signal or value in the first state if the comparator output signal is in the first state after the non-zero predetermined time and before the given one of the first and second switching devices is turned off.

4. The power conversion system of claim 3, wherein the controller is operative to selectively increase a modulation switching frequency in providing the first and second switching control signals responsive to receiving the detection signal or value in the first state.

5. The power conversion system of claim 2, comprising:

an analog to digital converter receiving the sense signal and providing a sense value representing resonant current flowing in the series circuit;

at least one processor programmed to:

implement the controller by providing the first and second switching control signals as modulated signals to the switching circuit, and implement the detection circuit by comparing the sense value with the predetermined threshold, and selectively modifying the first and second switching control signals responsive to the sense value being less than the predetermined threshold in the predetermined portion of the given half cycle.

6. The power conversion system of claim 5, wherein the predetermined threshold is an adjustable value stored in an electronic memory operatively coupled with the at least one processor.

7. The power conversion system of claim 2, wherein the controller is operative to selectively increase a modulation switching frequency in providing the first and second switching control signals responsive to receiving the detection signal or value in the first state.

8. The power conversion system of claim 2, comprising:

a second detection circuit operatively coupled with the sensing circuit to receive the sense signal and operative to selectively provide a second detection signal or value to the controller in a first state if the amplitude of the sense signal is below a second predetermined threshold a second non-zero predetermined time after the given one of the first and second switching devices is turned on, and to provide the second detection signal or value in a different second state if the amplitude of the sense signal is greater than or equal to the second predetermined threshold the second non-zero predetermined time after the given one of the first and second switching devices is turned on;

wherein the controller is operative to selectively increase a dead time value during which the first and second switching devices are both off responsive to receiving the second detection signal or value in the first state.

9. The power conversion system of claim 8, wherein the second detection circuit comprises:

a comparator including a first input coupled to receive the sense signal from the sensing circuit, a second input coupled to a voltage reference representing the second predetermined threshold, and a comparator output providing a comparator output signal in a first state if the amplitude of the sense signal is below an amplitude of the voltage reference, and in a different second state if the amplitude of the sense signal is greater than or equal to the amplitude of the voltage reference; and a timing circuit operatively coupled to receive the first and second switching control signals from the controller and to receive the comparator output signal from the comparator, the timing circuit operative to provide the second detection signal or value in the second state for the second non-zero predetermined time after the given one of the first and second switching devices is turned on, and to selectively provide the second detection signal in the first state if the comparator output signal is in the first state the second non-zero predetermined time after the given one of the first and second switching devices is turned on.

10. The power conversion system of claim 8, comprising:

an analog to digital converter receiving the sense signal and providing a sense value representing resonant current flowing in the series circuit;

at least one processor programmed to:

implement the controller by providing the first and second switching control signals as modulated signals to the switching circuit, and implement the second detection circuit by comparing the sense value with the second predetermined threshold, and selectively modifying the first and second switching control signals to increase the dead time value responsive to the sense value being less than the second predetermined threshold the second non-zero predetermined time after the given one of the first and second switching devices is turned on.

11. The power conversion system of claim 1, comprising:

a second detection circuit operatively coupled with the sensing circuit to receive the sense signal and operative to selectively provide a second detection signal or value to the controller in a first state if the amplitude of the sense signal is below a second predetermined threshold a second non-zero predetermined time after the given one of the first and second switching devices is turned on, and to provide the second detection signal or value in a different second state if the amplitude of the sense signal is greater than or equal to the second predetermined threshold the second non-zero predetermined time after the given one of the first and second switching devices is turned on;

wherein the controller is operative to selectively increase a dead time value during which the first and second switching devices are both off responsive to receiving the second detection signal or value in the first state.

12. The power conversion system of claim 11, wherein the second detection circuit comprises:
a comparator including a first input coupled to receive the sense signal from the sensing circuit, a second input coupled to a voltage reference representing the second predetermined threshold, and a comparator output providing a comparator output signal in a first state if the amplitude of the sense signal is below an amplitude of the voltage reference, and in a different second state if the amplitude of the sense signal is greater than or equal to the amplitude of the voltage reference; and
a timing circuit operatively coupled to receive the first and second switching control signals from the controller and to receive the comparator output signal from the comparator, the timing circuit operative to provide the second detection signal or value in the second state for the second non-zero predetermined time after the given one of the first and second switching devices is turned on, and to selectively provide the second detection signal in the first state if the comparator output signal is in the first state the second non-zero predetermined time after the given one of the first and second switching devices is turned on.

13. The power conversion system of claim 11, comprising:
an analog to digital converter receiving the sense signal and providing a sense value representing resonant current flowing in the series circuit;
at least one processor programmed to:
implement the controller by providing the first and second switching control signals as modulated signals to the switching circuit, and
implement the second detection circuit by comparing the sense value with the second predetermined threshold, and selectively modifying the first and second switching control signals to increase the dead time value responsive to the sense value being less than the second predetermined threshold the second non-zero predetermined time after the given one of the first and second switching devices is turned on.

14. The power conversion system of claim 1, wherein the controller is operative to selectively increase a modulation switching frequency in providing the first and second switching control signals responsive to receiving the detection signal or value in the first state.

15. The power conversion system of claim 1, wherein the series circuit further comprises a second inductance connected in parallel with the transformer primary winding; and wherein the sensing circuit comprises:
a current transformer having a primary winding connected in the series circuit to sense the resonant current flowing in the series circuit, and a secondary winding, and
a rectifier circuit operatively coupled to rectify a signal from the secondary winding and to provide the sense signal representing an absolute value of the resonant current flowing in the series circuit.

16. A control apparatus for operating a series resonant or LLC power conversion system with a series circuit and a switching circuit, the control apparatus comprising:
a modulation controller operatively coupled to provide first and second switching control signals as alternating modulated signals to corresponding first and second switching devices of the power conversion system in each of a plurality of switching cycles to modify a voltage at a switching node to control a converter output voltage; and
a detection circuit comprising an input for receiving a sense signal representing a resonant current flowing in the series circuit, and an output providing a detection signal or value to the controller in a first state if an amplitude of the sense signal is below a predetermined threshold in a predetermined portion of a given half cycle of a given one of the plurality of switching cycles and to provide the detection signal or value in a different second state if the amplitude of the sense signal is greater than or equal to the predetermined threshold in the predetermined portion of the given half cycle;
wherein the controller is operative to selectively modify the first and second switching control signals to promote zero voltage switching or near-zero voltage switching operation of the first and second switching devices in response to receiving the detection signal or value in the first state.

17. The control apparatus of claim 16, wherein the controller is operative to selectively increase a modulation switching frequency in providing the first and second switching control signals in response to receiving the detection signal or value in the first state.

18. The control apparatus of claim 16, comprising:
a second detection circuit comprising an input for receiving a sense signal to receive the sense signal, and an output providing a second detection signal or value to the controller in a first state if the amplitude of the sense signal is below a second predetermined threshold a second non-zero predetermined time after the given one of the first and second switching devices is turned on, and to provide the second detection signal or value in a different second state if the amplitude of the sense signal is greater than or equal to the second predetermined threshold the second non-zero predetermined time after the given one of the first and second switching devices is turned on;
wherein the controller is operative to selectively increase a dead time value during which the first and second switching devices are both off in response to receiving the second detection signal or value in the first state.

19. The control apparatus of claim 16, comprising an integrated circuit including:
an analog to digital converter receiving the sense signal and providing a sense value representing resonant current flowing in the series circuit;
at least one processor operatively coupled to receive the sense signal from the analog to digital converter and having outputs operatively coupled to provide the first and second switching control signals to the first and second switching devices, the at least one processor programmed to implement the modulation controller and to implement the detection circuit.

20. A method for controlling a resonant power conversion system, the method comprising:
sensing a resonant current flowing in a series circuit of the power conversion system;
determining whether the resonant current is below a predetermined threshold in a predetermined portion of a given modulation half cycle, the predetermined portion beginning a non-zero predetermined time after a switching device of the power conversion system is turned on and ending before the switching device is turned off; and
in response to determining that the resonant current is below the predetermined threshold in the predetermined portion of the given modulation half cycle, selectively modifying at least one modulation switching control signal provided to the power conversion system to promote zero voltage switching or near-zero voltage switching operation of the switching device.

21. The method of claim 20, comprising: in response to determining that the resonant current is below the predetermined threshold in the predetermined portion of the given modulation half cycle, selectively shutting down and restarting the power conversion system.

22. The method of claim 20, comprising: in response to determining that the resonant current is below the predetermined threshold in the predetermined portion of the given modulation half cycle, selectively turning off an active MOSFET and delaying turn on of a next MOSFET in a primary side bridge of the power conversion system.

* * * * *